United States Patent
Mei et al.

(10) Patent No.: US 9,874,984 B2
(45) Date of Patent: Jan. 23, 2018

(54) PRINTED DOUBLE-WRAPPED COIL ON PAPER FOR PROJECTIVE CAPACITANCE SENSING

(71) Applicant: Palo Alto Research Center Incorporated, Palo Alto, CA (US)

(72) Inventors: Ping Mei, San Jose, CA (US); Tse Nga Ng, San Diego, CA (US); Janos Veres, San Jose, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 305 days.

(21) Appl. No.: 14/870,854

(22) Filed: Sep. 30, 2015

(65) Prior Publication Data

US 2017/0090613 A1    Mar. 30, 2017

(51) Int. Cl.
*G06F 3/041* (2006.01)
*G06F 3/044* (2006.01)

(52) U.S. Cl.
CPC .... *G06F 3/044* (2013.01); *G06F 2203/04103* (2013.01); *G06F 2203/04108* (2013.01)

(58) Field of Classification Search
CPC ........ G06F 3/045; G06F 3/041; G02B 27/017
USPC .................................................... 345/13, 174
See application file for complete search history.

(56) References Cited

U.S. PATENT DOCUMENTS

| | | | |
|---|---|---|---|
| 6,188,391 | B1 | 2/2001 | Seely et al. |
| 7,099,496 | B2 | 8/2006 | Benkley, III |
| 7,932,802 | B2 | 4/2011 | Wei et al. |
| 2006/0097991 | A1 | 5/2006 | Hotelling |
| 2016/0226292 | A1* | 8/2016 | Yoon ...................... H02J 50/10 |

OTHER PUBLICATIONS

"Radio Frequency Characteristics of Printed Meander Inductors and Interdigital Capacitors" Jpn. J. Appl. Phys. 52(2013)05DC08-1.
O'Connor, "mTouch Projected Capacitive Touch Screen Sensing Theory of Operation", Microchip TB3064, Microchip Technology Inc., 2010, pp. 1-16.
Barrett, "Projected-Capacitive Touch Technology", Information Display, Mar. 2010, pp. 16-21.

* cited by examiner

*Primary Examiner* — Calvin C Ma
(74) *Attorney, Agent, or Firm* — Fay Sharpe LLP

(57) ABSTRACT

Touch user interfaces have been an essential element in the use of smartphones and tablets. An improved touch or near touch sensing structure made of a printed conductive double-wrapped coil is disclosed. A printable substrate is used to provide a base for the double-wrapped coil. On the printable substrate, a double-wrapped coil is printed using at least one flexible conductive material. The double-wrapped coils can be printed sequentially, simultaneously, parts of the two coils are printed and then the rest of the coil parts are printed, or any other useful printing order. The double-wrapped coil provides an increased sensing area and therefore can compute a more efficient capacitance.

20 Claims, 11 Drawing Sheets

PRINTED DOUBLE-WRAPPED COIL ON PAPER FOR PROJECTIVE CAPACITANCE SENSING

BACKGROUND

The present application is related to a touch or near touch sensing device structure, and finds particular application in connection an improved projective capacitive touch and/or near touch-sensing device and will be described with particular reference thereto. It is to be understood, however, that it also finds application in other usage scenarios, and is not necessarily limited to the aforementioned exemplary embodiment.

Touch and near touch user interfaces have been an essential element to the popularity of smartphones and tablets as well as other devices. A conventional projective capacitive sensing device is made by a matrix of diamond shaped conductive pads. There is a gap between each row and column pad, which forms a coplanar capacitor that acts as the sending aperture. A drive signal can be applied to one of the pads, on either the row or the column, and, by capacitive coupling, the signal is picked up from the other pad. When a finger touches or nears a panel having these configurations, it distorts the local electrostatic field at that point causing a measurable change in capacitance.

As touch and near touch sensing technology has developed, the cost of the sensor device has steadily dropped. As a result, inexpensive touch sensing devices can be used in broad applications, not only for computer or smartphone interfaces, but also for a variety of things that may be connected to the internet cloud services.

Projected capacitive sensing is able to sense a finger touch or near touch through a thin interlayer such as a glove. In addition to touch or near touch sensing, the capacitive aperture sensing is sensitive to surface textures and therefore can be used as a texture sensor. However, the effective sensing geometry is at the edges of the diamond pad, which forms the sensing gap with a neighboring pad in the conventional device.

INCORPORATION BY REFERENCE

The following references, the disclosures of which are incorporated herein by reference in their entireties, are mentioned:

U.S. Pub. No. 2006/0097991, published May 11, 2006, entitled Multipoint Touchscreen, by Hotelling, et al.

BRIEF DESCRIPTION

In one aspect of the presently described embodiments, a touch or near touch sensing device is described. The device includes a printable substrate and a flexible conductive material. The printable conductive material is used to print two conductive double-wrapped coils onto the printable substrate.

In another aspect of the presently described embodiments, there is provided a method for printing a touch and/or near touch sensing device. The method prints a pair of coils of flexible conductive material with a printer arrangement onto a substrate. The printed coils are printed such that they form a double-wrapped coil. The double-wrapped coil of flexible conductive material is, in one embodiment, cured using an infrared lamp. The double-wrapped coil is connected to a device, wherein when a finger touches or nears the double-wrapped coil, a signal is sent to the device indicating the capacitance change across the double-wrapped coil.

In another aspect of the presently described embodiments, a touch and/or near touch sensing control panel is described. The control panel is comprised of a printable substrate such as a plastic laminated paper holding a plurality of printed double-wrapped coils. In certain embodiments, polyethylene naphthalate (PEN), polyethylene terephthalate (PET), coated paper, and polymide may, among other materials be used as the printable substrate. The double-wrapped coils are arranged on the printable substrate in an array. The touch or near touch sensing control panel further includes an embodiment where the plurality of printed double-wrapped coils are placed in locations corresponding to particular images. A signal readout device is coupled to a Bluetooth device, wherein when the image is touched, a touch signal is transmitted to a device with cloud service applications.

BRIEF DESCRIPTION OF THE DRAWINGS

The exemplary embodiments may take form in various components and arrangements of components, and in various steps and arrangements of steps. The drawings are only for purposes of illustrating the preferred embodiments and are not to be construed as limiting the present exemplary embodiment.

DETAILED DESCRIPTION

Figures 1A, 1B:
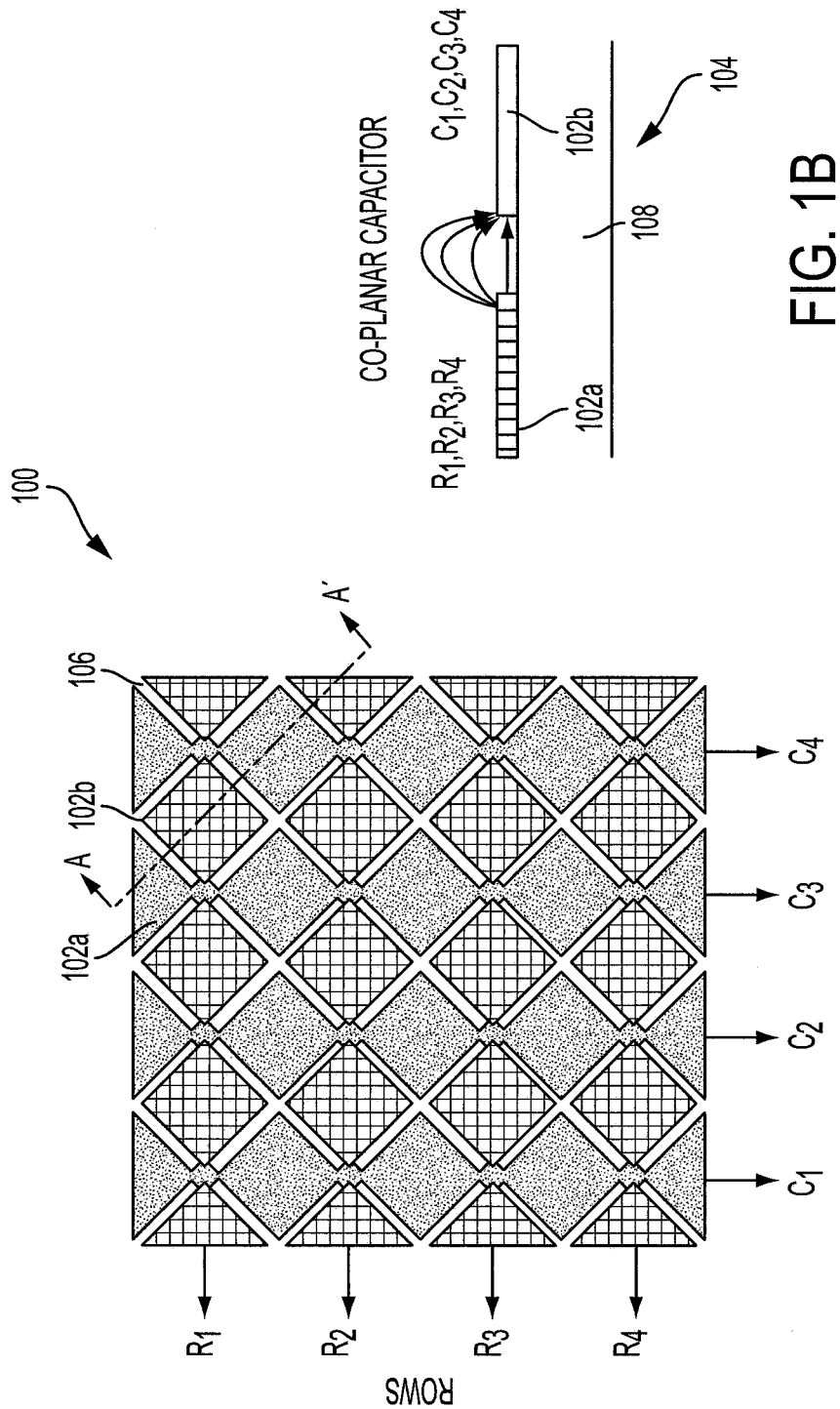
FIG. 1A illustrates a conventional projective capacitive sending device structure.
FIG. 1B illustrates a cross-sectional side view of a co-planar capacitor of panel 100 of FIG. 1A.

FIG. 1A describes a conventional projective capacitive sensing device structure (or panel) 100 as used in existing devices. It is made by a matrix of diamond shaped conductive pads 102a, 102b (only some identified for clarity of the drawing). There is a gap 106 (only some identified for clarity of the drawing) between each of the pads 102a, 102b for each row $R_1$, $R_2$, $R_3$, $R_4$ and column $C_1$, $C_2$, $C_3$, $C_4$, the pads 102*a*, 102*b* forming a coplanar capacitor. Such a capacitor 104 is shown more clearly in the cross-sectional view (A-A') of FIG. 1B, and acts as a sensing aperture. A drive signal is applied to one of the pads 102*a* (row or column) and, by capacitance coupling, a signal is picked up from a neighboring pad 102*b*. When a finger touches or is near the panel 100, it alters a local electrostatic field between the pads 102*a*, 102*b*. This is measurable as a change in capacitance. If a finger bridges the gap 106 between two of the pads 102*a*, 102*b* the electric field is further interrupted and detected by a controller (not shown).

With attention now to the present embodiments, described is an improved sensing structure (i.e. touch or near touch sensing array) made of a conductive double-wrapped coil. The double-wrapped coil forms a coplanar capacitor with a long gap between two neighboring electrodes, e.g. coils. This geometry provides an efficient sensing aperture and enhances signal/noise (S/N) ratio. The inexpensive touch or near touch sensing device described herein can be used in a multitude of applications from computer or smartphone applications as well as devices connected to the internet cloud services, among others.

Figure 2A:
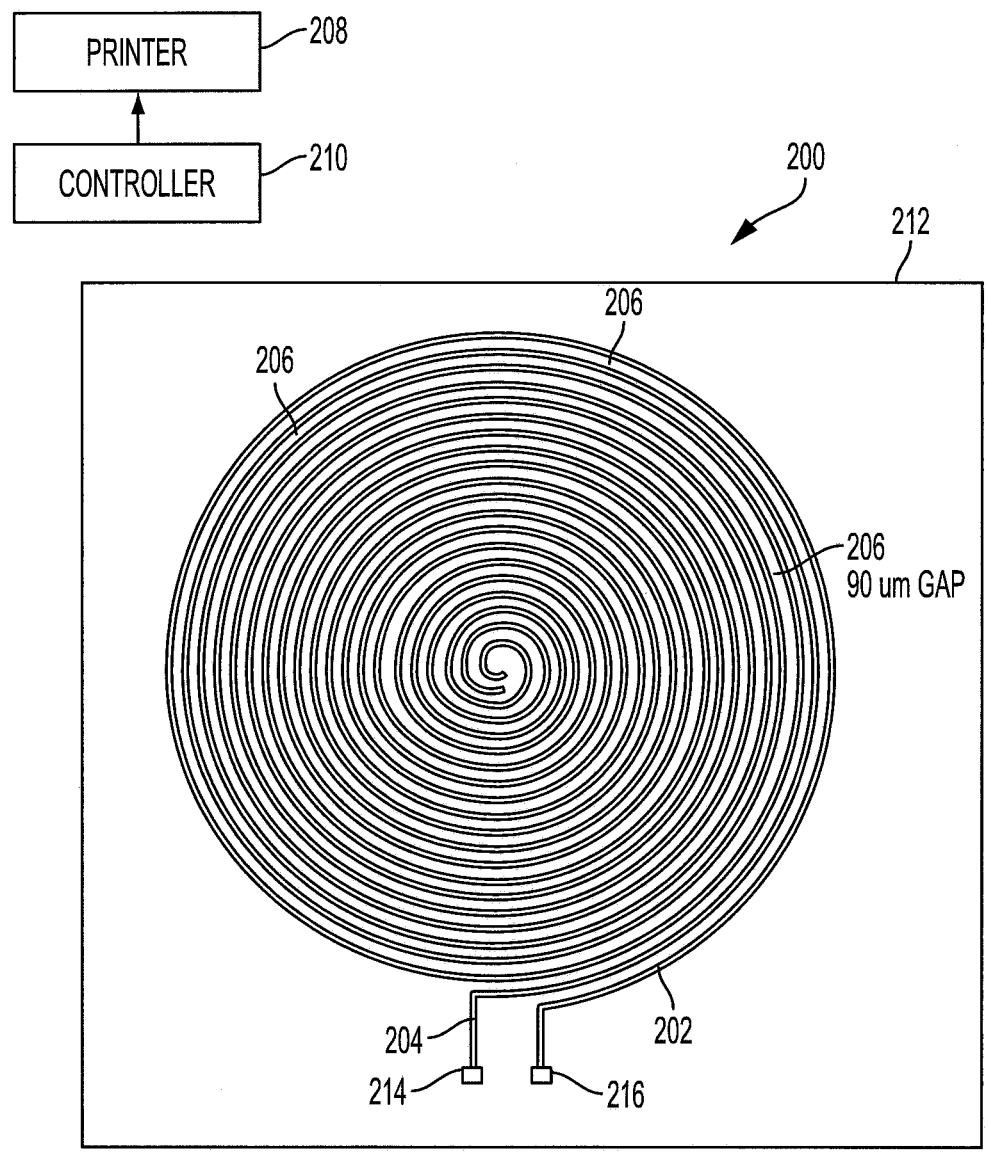
FIG. 2A illustrates a capacitor formed as a double-wrapped coil.

Turning to FIG. 2A, illustrated is an embodiment of such an improved touch or near touch sensing structure configured as a conductive double-wrapped coil arrangement 200. Two coils 202, 204 are placed near each other but are physically and electrically isolated. In the described embodiment, the two coils 202, 204 are printed by a printer arrangement 208 that is controlled by a controller 210. The controller 210 contains the necessary instructions to precisely print the double-wrapped coils 202, 204 onto a printable substrate 212. The double-wrapped coils 202, 204 terminate at connectors 214, 216.

In various embodiments, the printer arrangement 208 can include an inkjet printer, gravure printer, screen-printer, aerosol printer, and/or photolithography arrangement, among others.

Figure 6:
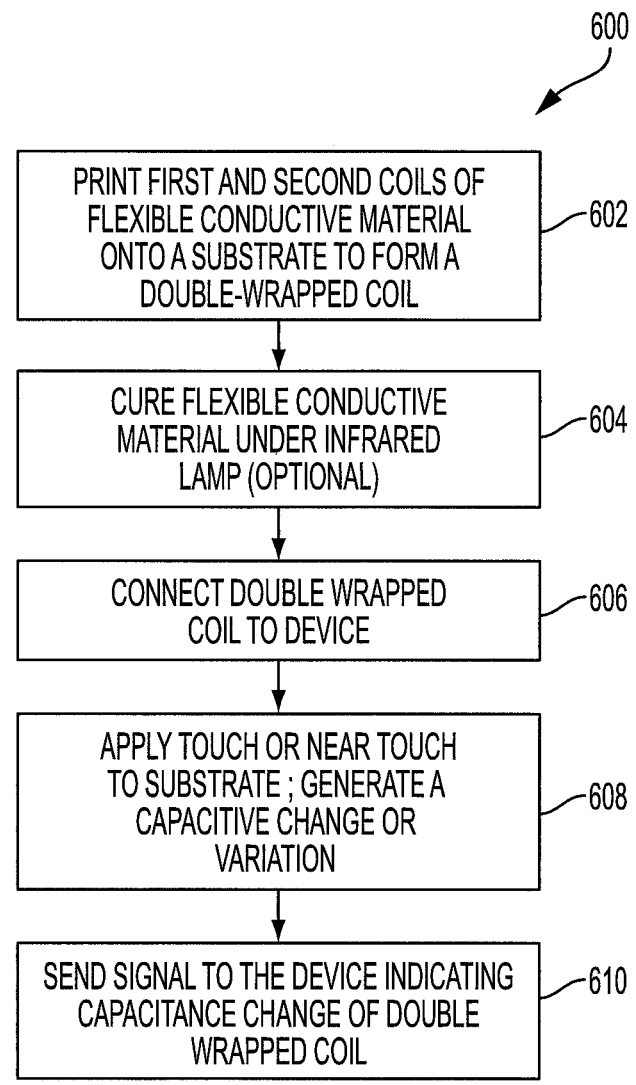
FIG. 6 describes a method for printing a double-wrapped coil as described by the embodiments.

As will be further described in FIG. 6, in one embodiment a first coil 202 is printed on the printable substrate and a second coil 204 is printed on the same printable substrate 202 but without touching the first coil 202. In alternative embodiments, the printable substrate may be conductive; non-conductive; flexible; or non-flexible. In further alternative embodiments, the first coil 202 and second coil 204 are printed sequentially; simultaneously; parts of the two coils are printed and then the rest of the coil parts are printed; or any other useful printing order.

In this embodiment, a gap 206 between the traces (i.e. coils) is about 90 μm. The total diameter of the double-wrapped coil 202, 204 is 13.4 mm and the total length of the gap is 426 mm (2 times the length of a coil). In comparison, if the dimension of an edge of a conventional pad is 13.4 mm, the total gap length will be 53.6 mm (4 times the edge). Therefore, the double-wrapped coil 202, 204 has a sensing gap about 8 times longer than the conventional pad 106 (FIGS. 1A and 1B). This feature provides a larger capacitance change when an object touches or nearly touches the conductive double-wrapped coil arrangement 200 as well as a panel of such conductive double-wrapped arrangement (such as may be used in the device of FIG. 4). The gap dimension between the traces (i.e. coils) ranges from 3 μm to 1 mm depending on the implementation. The diameter of each coil ranges in some embodiments from 50 μm to 10 mm, and in others the overall diameter is between 10 mm to 20 mm. The overall length of the coil depends on the design of the gap, shape, and size of the coil.

Figure 2B:
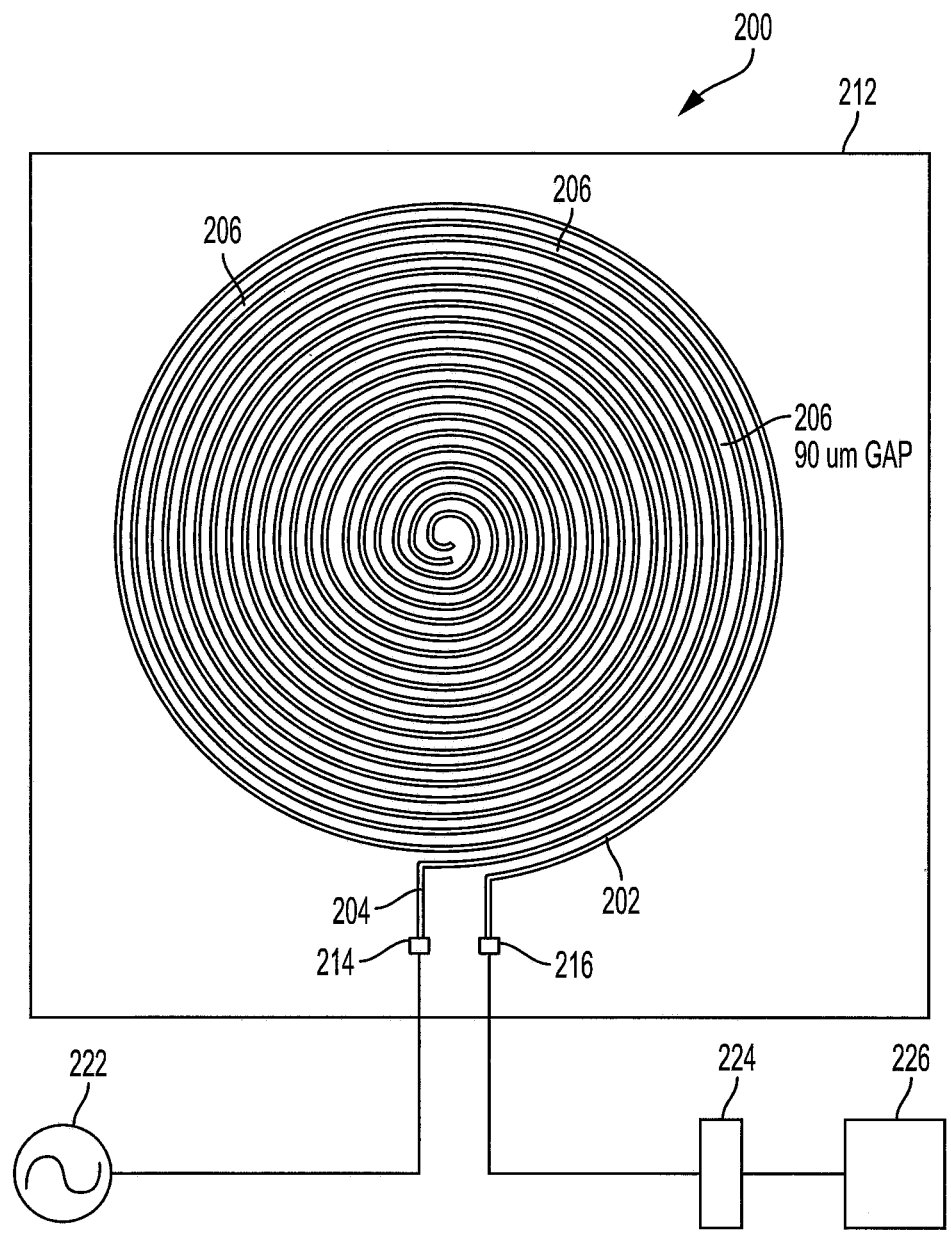
FIG. 2B illustrates the capacitor of FIG. 2A incorporated within a circuit.

Turning to FIG. 2B, depicted is the capacitor of FIG. 2A incorporated within a capacitance circuit 220. The circuit includes coils 202 and 204, where coil 202 acts as a driving line and coil 204 acts as a sensing line. The coils, as noted previously, are spatially separated thereby forming the gap 206. The driving line coil 202 is electrically connected to an energy source (e.g., a voltage source) 222, and the sensing line coil 204 is electrically connected to a capacitive sensor device 224. The driving line coil 202 is configured to carry a current generated by the energy source 222, and the sensing line coil 204 is configured to carry a current to the capacitive sensor device 224. When no object is present at the gap 206, any capacitive coupling at the gap 206 stays fairly constant. When a finger (or other appropriate object, e.g., a stylus) touches or nearly touches the gap 206, the previously existing capacitive coupling is altered. The finger shunts a portion of the capacitive field whereby charge across the gap 206 is altered. The variation in the capacitive coupling alters the current being carried in the sensing line coil 202, which is sensed by the capacitive sensor device 224 and provides this information to a controller 226.

Figure 3:
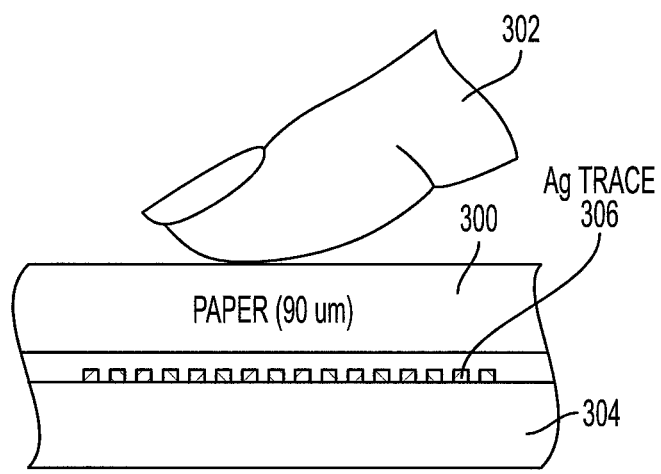
FIG. 3 illustrates a cross section illustration of a double-wrapped capacitor coil.

As illustrated in FIG. 3, by placing a thin substrate such as, but not limited to paper (~90 μm thick) 300, over the double-wrapped coil 306 formed on a substrate 304, when a finger 302 touches or nearly touches the double-wrapped coil 306 this causes a capacitance of the double-wrapped coil 306 to change. When a finger touches or nearly touches the double-wrapped coil 306 printed on the substrate 304, it alters the electric field lines and therefore changes the capacitance. In other embodiments, a stylus or other touching device (not shown) is used to touch or nearly touch the double-wrapped coil 306. The flexible conductive material of the coils may include silver, gold, copper, or conductive carbon, among others.

In this embodiment, the double-wrapped coil 306 is printed on a flexible substrate 304. The following table shows the results of the capacitance measurement with and without a finger touching or nearly touching the double-wrapped coil 306 at different frequencies. Due to dielectric dispersion, the capacitances for both with and without a finger touch are smaller at a larger frequency. The dielectric dispersion caused by the finger seems larger since the change of the capacitance is also larger when the frequency is lower. It is to be understood that nearly touching is understood to mean the ginger is within sufficient proximity to alter the electric fields existing between the two coils.

TABLE 1

| Frequency of Measurement | Capacitance without Finger Touch | Capacitance with Finger Touch | % of Capacitance Change |
| --- | --- | --- | --- |
| 1 kHz | 41.8 pF | 46 pF | 10% |
| 500 Hz | 54 pF | 62 pF | 14.8% |
| 100 Hz | 130 pF | 150 pF | 15.4% |

Figure 4:
FIG. 4 illustrates an example of low cost printed capacitive sensing coils such as a printed keyboard and a laminated control panel of a portable device.

With a sufficient change in capacitance (as for example the changes shown in Table 1), the S/N ratio requirement for a readout device can be relaxed and therefore the cost of a reading device may be reduced. With this feature, various applications may be enabled. In one example, a paper based instrument control panel may be made by printing a laminated control panel image 400 on one side of a substrate and printing a sensing coil on the other side as shown in FIG. 4. The advantages of paper control panel include low cost, customer design, disposable (for sanitation reasons), lightweight, and may be laminated on various surfaces. Additionally, projected capacitive sensing, as disclosed here, is able to sense a finger touch or near finger touch through a thin interlayer such as a glove.

In certain embodiments, polyethylene naphthalate (PEN), polyethylene terephthalate (PET), coated paper, and polymide may, among other materials be used as the printable substrate.

Figure 5:
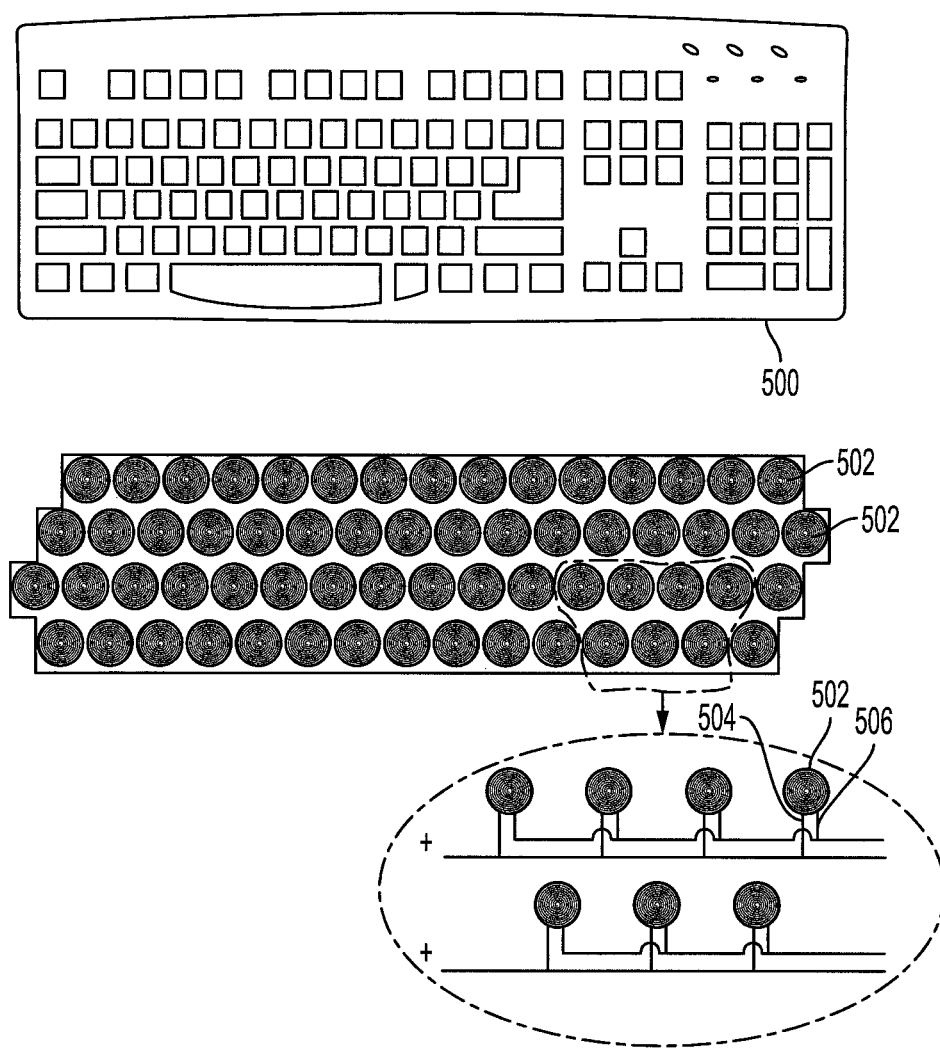
FIG. 5 illustrates the double-wrapped coil in a keyboard.

In another embodiment, FIG. 5 illustrates a lightweight consumer computer keyboard 500 utilizing a double-wrapped coil arrangement of the present application. Each of the keys of the printed keyboard corresponds to a single double-wrapped coil 502. As intended to be shown by the breakout portion of FIG. 5, each of the individual double-wrapped coils 502 are respectively connected to (and/or used as) one of a driving line 504 or a sensing line 506 (as discussed in connection with FIG. 2B).

When a finger touches or nearly touches a given key on the surface of the keyboard 500, the device detects the change in capacitance and sends a signal via connection lines 504, 506 to a corresponding output device indicating which letter was pressed. The output device maybe a wired or wireless detector and may be a specific design such as Bluetooth, Wi-Fi, among others.

FIG. 6 describes a particular method for printing the described double-wrapped coil. It is to be understood other methods may be employed. The method 600 comprises printing a first and second coil of flexible conductive material, such as silver, onto a flexible substrate 602. The material is printed by any number of printer arrangements onto, for example, a substrate of paper. The first coil and second coil are then printed around each other forming a double-wrapped coil 602. Each of the flexible lines (coils) of material are close but do not touch each other.

In this embodiment, the gap between the double-wrapped coils is about 90 μm, the diameter of the double-wrapped coil is about 13.4 mm, and the length is about 426 mm. Once the flexible conductive material is printed, it is cured, for example using an infrared lamp 604. This curing step is optional dependent upon the materials used. Upon curing, the double-wrapped coils are connected to a device 606 wherein, when a finger touches or nearly touches the double-wrapped coils a capacitance change occurs which may be measured 608. A signal based on the capacitance variation is then sent to a device 610.

Figure 7A:
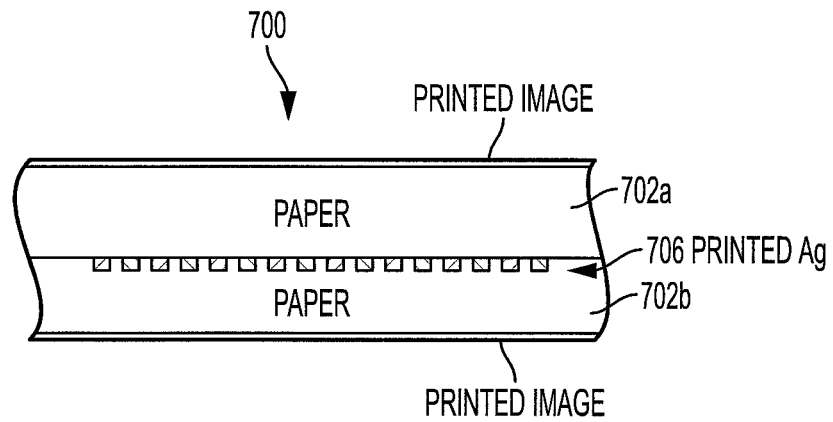
FIG. 7A illustrates one embodiment with the double-wrapped coil printed between two printed images.
Figure 7B:
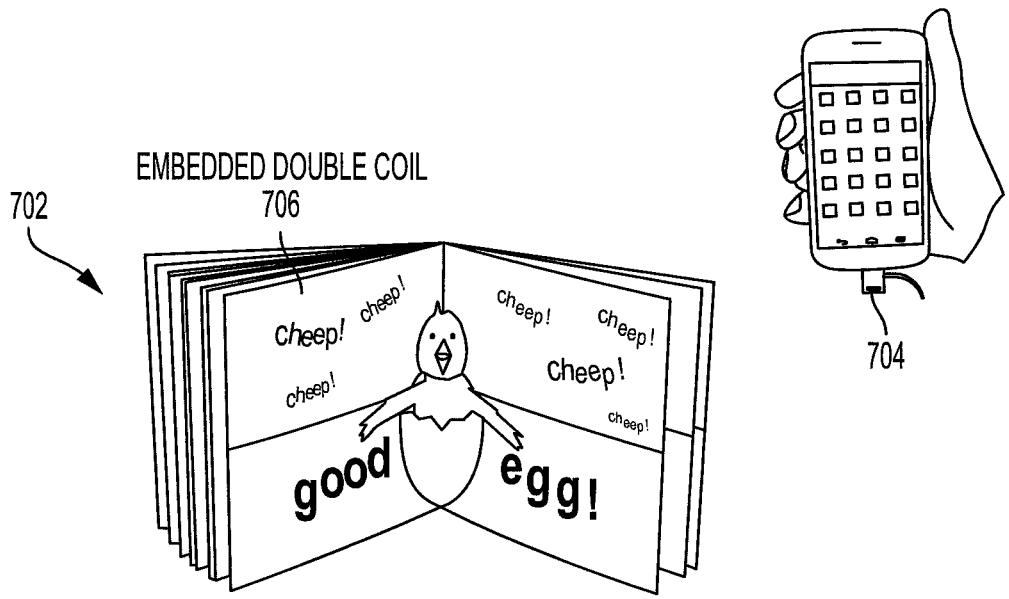
FIG. 7B illustrates one embodiment as shown in FIG. 7A where the double-wrapped coil is embedded in a children's book that is linked to a Bluetooth enabled device.

The printed double-wrapped coils can be applied to form low cost capacitance sensing devices used in a variety of implementations including but not limited to control panels, keyboards, etc. As illustrated in FIG. 7A, and FIG. 7B a double-wrapped coil 706 is embedded between two pieces of paper 702a, 702b in a structure 700. When a finger touches or nearly touches one of the pieces of paper 702a, 702b, a signal is sent to a device (e.g. a Bluetooth device) 704 indicating a change in the capacitance such as by displaying an image or playing a sound. In alternative embodiments, a speaker may be incorporated within the paper 702a, 702b whereby the signal is output to the embedded speaker.

Figure 8:
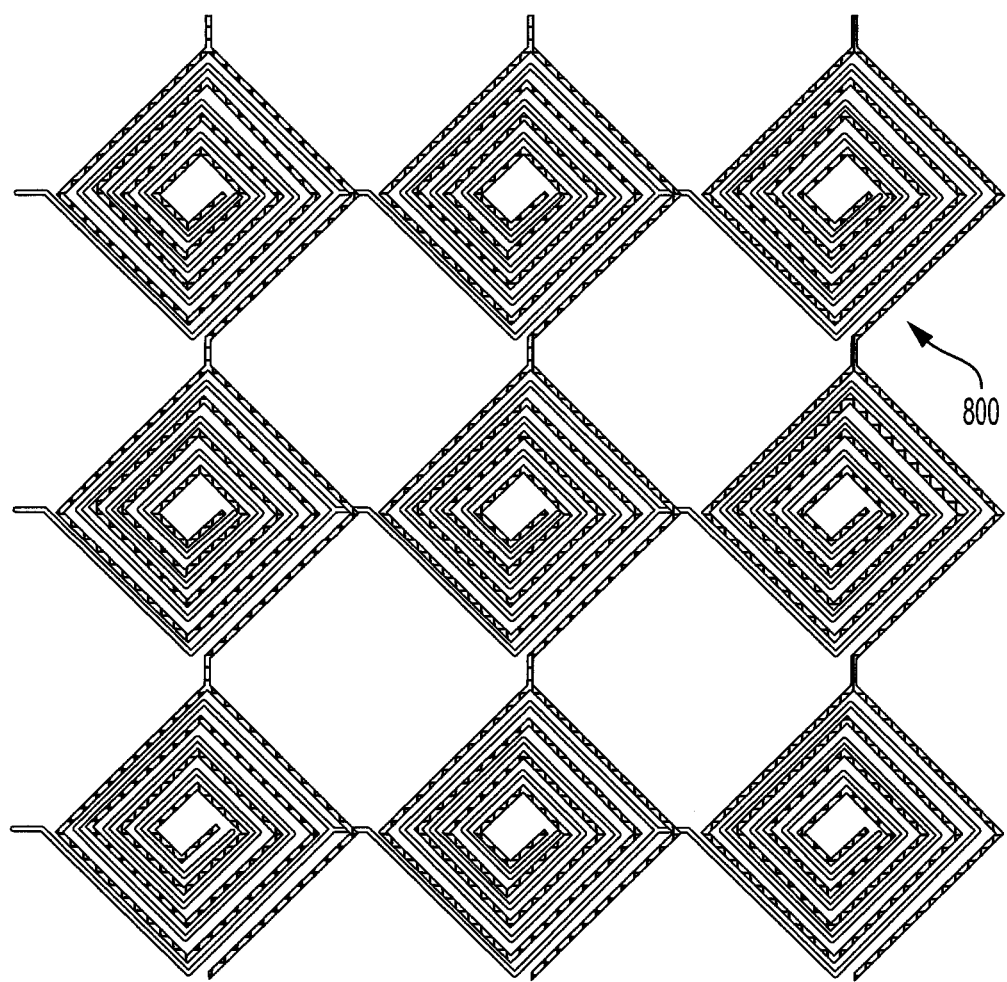
FIG. 8 illustrates an embodiment of a capacitor based capacitive sending device structure formed by a double-wrapped coil.

The shape of the double wrapped coil can differ from those that have been shown. For example, FIG. 8 depicts an embodiment of a sensing structure 800 consisting of a plurality of diamond shaped double wrapped coils 802, interconnects by lines 804, 806. It is to, be appreciated that double wrapped coils can be configured as pentagons, stars shaped, as well as other geometrics designs.

Figure 9:
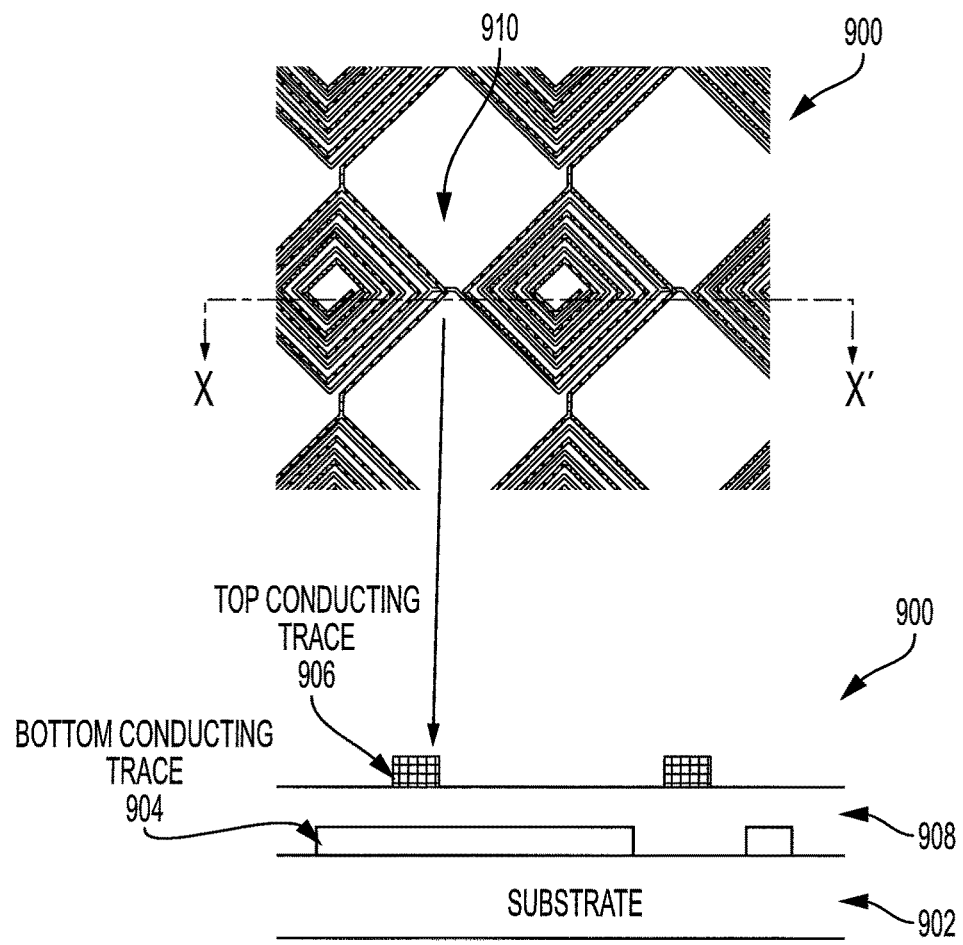
FIG. 9 illustrates a cross section of a double-wrapped coil configuration.
Figure 10B:
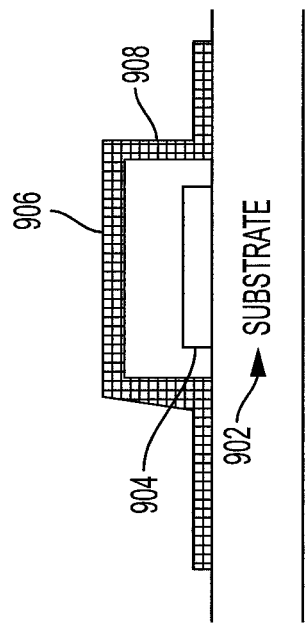
FIG. 10B illustrates another embodiment of a cross section view of the traces on a double-wrapped coil configuration.
Figure 10A:
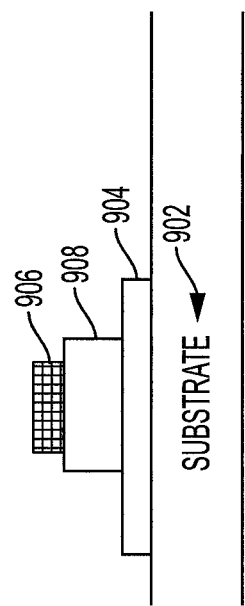
FIG. 10A illustrates a cross section view of the traces of a double-wrapped coil configuration.

Turning to FIG. 9, illustrated is a cross-sectional view of a portion 910 of the structure 800 of FIG. 8. In this view, the depicted double wrapped coil portion 900 is designed as a two-layer diamond shape capacitor arrangement. The structure includes a substrate 902 on whose surface is printed a bottom conducting trace 904 which serves as a continuous electrode. As shown in FIG. 9 and more closely in FIG. 10A, a top conducting trace 906 is printed above the bottom trace 904, also acting as a continuous electrode. In an alternative embodiment, the two double-wrapped coils can be printed on the same layer with a crossover structure as shown in FIG. 10B. In an alternative embodiment, insulating layer 908 can be replaced by a patterned island located at 910.

The traces 904, 906 are fixed in close proximity, while nevertheless being physically and electrically isolated from each other. In certain embodiments, the isolation is achieved by use of an insulating layer 908. Similar to the previous described embodiments, one of the traces 904, 906 of the double-wrapped coil portion 900 is used as a capacitor for sensing a capacitance change when an object is near or touching the surface of the capacitive sensor, which passes variations in capacitance between the traces to a capacitance sensing device, such as discussed for example in connection with FIG. 2B. It is to be understood FIG. 9 illustrates relevant elements of a two-layer diamond shaped capacitor arrangement and that such a sensor may include additional components or layers such as a front panel to which a finger (or stylus) is touched or nearly touched in order to alter the capacitance between traces 904, 906, as known in the art.

It will be appreciated that variations of the above-disclosed and other features and functions, or alternatives thereof, may be desirably combined into many other different systems or applications. All such variations, alternatives, modifications, or improvements therein that may be subsequently made by those skilled in the art are also intended to be encompassed by the following claims.

What is claimed is:

1. A touch and/or near touch sensing device comprising:
   a printable substrate;
   at least one flexible conductive material; and
   two conductive double-wrapped coils printed using the at least one flexible conductive material on the printable substrate.

2. The device of claim 1, wherein the two conductive double-wrapped coils have a gap between the coils ranging between 3 μm to 1 mm.

3. The device of claim 2, wherein the gap has a total length dependent upon the gap, shape and size of the double-wrapped coil.

4. The device of claim 1, wherein the two conductive double-wrapped coils have a total diameter range between of 50 μm to 10 mm.

5. The device of claim 1, wherein a touch and/or a near touch is applied to the flexible conductive material, a change in capacitance is generated by the printed double-wrapped coils.

6. The device of claim 5, wherein the change in capacitance is detected by an external circuit.

7. A method for printing a touch and/or near touch sensing device comprising:
   printing two coils using a flexible conductive material with a printer arrangement onto a substrate wherein the coils form a double-wrapped coil;
   connecting the double-wrapped coil to a device;
   connecting the double-wrapped coil for receipt of a finger touch and/or near touch to the substrate; and
   sending a signal to the device corresponding to the capacitance change across the double-wrapped coil.

8. The method according to claim 7, wherein the flexible conductive material of the double-wrapped coil is cured using an infrared lamp.

9. The method of claim 7, wherein the substrate is a plastic coated paper.

10. The method of claim 9, wherein the plastic coated paper is Arjowiggins Paper: PowerCoat XD 125.

11. The method of claim 7, wherein the conductive double-wrapped coils have a gap ranging between 3 µm to 1 mm.

12. The method of claim 11, wherein the two conductive double-wrapped coils have a total diameter ranging between 10 mm to 20 mm.

13. The method of claim 12, wherein the gap has a total length dependent upon the gap, shape and size of the double-wrapped coil.

14. A touch and/or near touch sensing control panel, comprising:
   a printable substrate;
   at least one flexible conductive material; and
   a plurality of printed double-wrapped coils in an array as a plurality of capacitors, the plurality of printed double-wrapped coils printed using the at least one flexible conductive material.

15. The control panel of claim 14, wherein the printed double-wrapped coil sensitivity depends upon the distance between the coils.

16. The control panel of claim 14, wherein the plurality of printed double-wrapped coils are embedded inside laminated paper.

17. The control panel of claim 16, wherein the laminated paper is a plastic coated paper.

18. The control panel of claim 14, wherein the printed double-wrapped coils have a gap between the coils of about 90 µm and a diameter ranging between 10 mm to 20 mm.

19. The control panel of claim 18, wherein the gap has a total length dependent upon the gap, shape and size of the double-wrapped coil.

20. The control panel of claim 14, further including:
   the plurality of printed double-wrapped coils are placed in locations corresponding to particular images; and
   a signal readout device is coupled to an output device, wherein when the image is touched and/or near touched, an output signal is transmitted.

* * * * *